United States Patent
Bradley et al.

(10) Patent No.: US 8,530,001 B2
(45) Date of Patent: Sep. 10, 2013

(54) ELECTROSTATIC COMPOSITION BASED ON A POLYAMIDE MATRIX

(75) Inventors: Gerard Bradley, Saronno (IT); Nicolangelo Peduto, Cesano Maderno (IT)

(73) Assignee: Rhodia Engineering Plastics S.r.l., Ceriano Laghetto (FR)

( * ) Notice: Subject to any disclaimer, the term of this patent is extended or adjusted under 35 U.S.C. 154(b) by 0 days.

(21) Appl. No.: 13/047,187

(22) Filed: Mar. 14, 2011

(65) Prior Publication Data

US 2011/0165336 A1 Jul. 7, 2011

Related U.S. Application Data

(62) Division of application No. 10/567,915, filed as application No. PCT/FR2004/002077 on Aug. 3, 2004, now abandoned.

(30) Foreign Application Priority Data

Aug. 8, 2003 (FR) ...................................... 03 09782

(51) Int. Cl.
*B05D 1/00* (2006.01)
(52) U.S. Cl.
USPC ........................................... 427/458; 427/475
(58) Field of Classification Search
None
See application file for complete search history.

(56) References Cited

U.S. PATENT DOCUMENTS

| | | | |
|---|---|---|---|
| 4,549,559 A | 10/1985 | Gueret et al. | |
| 5,387,653 A * | 2/1995 | Merval et al. | 525/420 |
| 5,614,588 A | 3/1997 | Steenblock et al. | |
| 6,025,055 A | 2/2000 | Bouilloux et al. | |
| 6,150,446 A | 11/2000 | Numata | |
| 6,171,523 B1 * | 1/2001 | Silvi et al. | 252/511 |
| 6,203,920 B1 | 3/2001 | Bouilloux et al. | |
| 6,267,148 B1 | 7/2001 | Katayama et al. | |
| 6,284,839 B1 | 9/2001 | Fahey et al. | |
| 6,344,513 B1 | 2/2002 | Numata | |
| 6,506,830 B1 | 1/2003 | Bussi et al. | |
| 6,913,804 B2 | 7/2005 | Lacroix et al. | |
| 2002/0037955 A1 | 3/2002 | Baumann et al. | |
| 2003/0092824 A1 | 5/2003 | Bastiaens et al. | |

FOREIGN PATENT DOCUMENTS

| | | |
|---|---|---|
| JP | 11-071515 A | 3/1999 |
| JP | 2000-273457 A | 10/2000 |
| JP | 2001-002915 A | 1/2001 |
| JP | 2001-358144 A | 12/2001 |
| JP | 2002-309101 A | 10/2002 |
| WO | WO 01/36536 A1 | 5/2001 |

OTHER PUBLICATIONS

Search Report issued Feb. 11, 2005, in corresponding International Application No. PCT/FR2004/002077.
"Pebax 4011" STN Registry Database No. 308078-71-9, Dec. 12, 2000.

* cited by examiner

*Primary Examiner* — Erma Cameron
(74) *Attorney, Agent, or Firm* — Dentons US LLP

(57) ABSTRACT

A process for producing an article, including: forming an article from a composition comprising a polyamide matrix, wherein the composition comprises: 2 to 10% by weight of carbon black as an electrically conductive filler, with respect to the total weight of the composition, and 1% to 30% by weight of an antistatic agent comprising a polyetheramide, with respect to the total weight of the composition; and applying paint to the article by electrostatic deposition.

28 Claims, No Drawings

ELECTROSTATIC COMPOSITION BASED ON A POLYAMIDE MATRIX

CROSS REFERENCE TO RELATED EARLIER APPLICATIONS

This application is a divisional of application Ser. No. 10/567,915, filed Oct. 31, 2006, now abandoned, which was the national stage filing under §371 of PCT/FR2004/002077, filed Aug. 3, 2004, which claims priority under 35 U.S.C. §119 of French Application No. 0309782, filed Aug. 8, 2003, the contents of which are incorporated herein by reference in their entirety.

FIELD OF THE INVENTION

The present invention relates to a composition based on a polyamide matrix comprising electrically conductive fillers and antistatic agents. The forming of this composition makes it possible to obtain plastic articles, such as, for example, bodywork components in the motor vehicle field, having a good ability to be painted by a process for the electrostatic deposition of the paint.

BACKGROUND

There exists a high demand in numerous industries for components made of polyamide materials. This is because these components are light and can be conceived and designed more easily than components made of steel or aluminum, in particular in the field of the motor vehicle industry.

However, plastic components present problems when it is desired to paint them.

Thus, for example, in the field of motor vehicles, there exist in particular three main methods for painting electrostatically, that is to say by movement of the particles under the influence of an electric current. The first, referred to as "inline" process, refers to a process according to which the component made of plastic is assembled on the vehicle after the latter has been subjected to degreasing and electroplating stages, followed by a drying stage. The component made of plastic and the vehicle are subsequently painted and dried by heating. The second, referred to as "online" process, refers to a process according to which the component made of plastic is assembled on the vehicle at the beginning of the process mentioned above. The plastic components
are thus subjected to degreasing, electroplating and drying stages at temperatures which can exceed 200° C. Consequently, for this type of process, it is necessary for the components made of plastic to be able to withstand higher temperatures. In a third process, referred to as "offline" process, the component made of plastic is first painted in order to be subsequently assembled on the vehicle.

When processes for painting by electrostatic deposition are used, poor adhesion of the paint to conventional plastic components is obtained. Specifically, the paint easily comes away and does not adhere or only slightly adheres to the plastic components.

In order to render plastic components suitable for being painted by a process for the electrostatic deposition of the paint, it is known to add conductive fillers to the thermoplastic matrix. However, the incorporation of these fillers has a negative effect on some properties of the plastics, such as the mechanical properties. Furthermore, the incorporation of conductive fillers significantly increases the melt viscosity of the thermoplastic matrices, rendering them unsuitable for use in certain processes for the forming of these matrices.

Thus, there exists a need to manufacture and use plastic components exhibiting excellent mechanical properties, such as good impact strength, and a good ability to be painted by a process for the electrostatic deposition of the paint.

INVENTION

The Applicant Company has demonstrated a composition based on a polyamide matrix comprising electrically conductive fillers and antistatic agents.

This polyamide composition makes possible the forming of articles exhibiting a good balance in mechanical properties, thermal properties and properties with regard to the ability to be painted, in particular by deposition of paint by an electrostatic process.

The plastic components according to the invention also exhibit a suitable linear thermal expansion coefficient (LTEC), in particular for the field of the motor vehicle industry. The plastic components according to the invention furthermore have a good temperature stability, a good surface appearance and a good propensity for molding.

These plastic components are thus very well suited to processes for painting by electrostatic deposition, such as the "inline", "online" and "offline" processes used in particular in the motor vehicle industry.

Moreover, it is apparent that the composition based on a polyamide matrix according to the invention has a significantly lower melt viscosity, in comparison with a polyamide composition comprising solely conductive fillers, which is in particular advantageous for certain processes for the manufacture of components, such as injection molding.

DETAILED ACCOUNT OF THE INVENTION

A first subject matter of the present invention is a composition comprising at least one polyamide matrix:
at least 2% by weight of electrically conductive fillers; and
at least 1% by weight of antistatic agents;
the percentages by weight being expressed with respect to the total weight of the composition.

This composition can comprise one or more types of electrically conductive fillers and one or more types of antistatic agents.

Preferably, the composition according, to the invention is a composition which dissipates static electricity and which exhibits a surface resistivity of between $10^5 \Omega$ and $10^{11} \Omega$, according to Standard IEC 61340-4-1.

The composition according to the present invention can also exhibit a discharge time of greater than or equal to 10 seconds, preferably of greater than or equal to 30 seconds, more preferably of greater than of equal to 50 seconds, measured according to Standard IEC 61340-5-1. The discharge time can, for example, be measured on a sheet (for example having the following dimensions: 200×150×3 mm) obtained from the composition according to the invention, to which a charge of 1000 volts (V) is applied. The discharge time corresponds to the time necessary for the electrical voltage at the surface of the sheet to change from 1000 V to 100 V.

The parameters of surface resistivity and of discharge time of the composition of the invention are highly appropriate in particular for the production of articles which are highly suitable for painting and which have a good compromise in mechanical properties.

The composition according to the invention can comprise from 2 to 50% by weight of electrically conductive fillers, with respect to the total weight of the composition, preferably from 2 to 30% by weight, more preferably still from 2 to 10% by weight, particularly from 2 to 5% by weight.

The electrically conductive fillers are preferably chosen from the group consisting of: a carbon black, a metal, a graphite, a conductive polymer, a glass and/or an inorganic filler coated with a metal layer, and/or their mixture.

The glass and/or the inorganic fillers can be coated with a layer of metal, such as nickel, aluminum, silver, iron, chromium and/or titanium, for example.

The electrically conductive fillers can be in the form of spheres, such as, for example, in the form of microspheres and/or nanospheres; of tubes, such as, for example, in the form of microtubes and/or nanotubes; and/or of fibers, such as, for example, in the form of microfibers and/or nanofibers. These fibers can be cut up and/or ground.

Use may be made, as conductive polymer, for example, of polyaniline, polypyrrole, polythiophene and/or poly-acetylene.

Preferably, the conductive filler according to the invention is carbon black.

The conductive carbon black is described in particular in Carbon Black, Second Edition, Revised and Expanded, Science and Technology, edited by J. B. Donnet, R. C. Bansal and M. J. Wang, Marcel Dekker Inc., pages 271-275. Preferably, the composition according to the invention comprises from 2 to 10% by weight of carbon black, preferably from 2 to 5% by weight, particularly from 2 to 4% by weight, as electrically conductive fillers, with respect to the total weight of the composition.

The antistatic agents used according to the present invention can also be referred to as "dissipating electrostatic agents".

Preferably, the composition according to the invention comprises from 1 to 30% by weight of antistatic agents, with respect to the total weight of the composition, more preferably still from 5 to 20% by weight.

The antistatic agents can be chosen, for example, from the group consisting of polyetheramides, sodium alkyl-sulfonates, alkylbenzenesulfonates, primary, secondary or tertiary amines, ethoxylated amines, ethoxylated alcohols, glyceryl monostearates, distearates or tristearates, and their mixtures.

The term "polyetheramides" is understood to mean various types of polymers comprising one or more polyamide blocks and one or more poly(alkylene oxide) blocks.

Preferably, the polyetheramide is a block polymer compound represented by the formula (I):

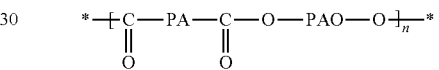

in which:
n is an integer between 5 and 50;
X represents an oxygen atom or an NH group;
PAO represents a poly(alkylene oxide) block;
PA represents a polyamide block, the repeat unit of which is represented by either of the formulae (IIa) or (IIb):

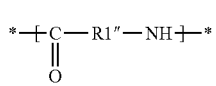

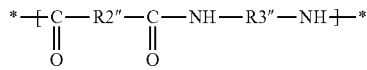

in which: $R^1$, $R^2$ and $R^3$ are aromatic or aliphatic radicals comprising 4 to 36 carbon atoms.

The block copolymer represented by the formula (I) is a polyether-block-amide or a polyetheresteramide. Such compounds are sold in particular by Atofina under the name of Pebax® and Ciba under the name of Irgastat. They comprise polyamide blocks and poly(alkylene glycol) blocks. The number of blocks of each nature is between 3 and 50. It is preferably between 10 and 15. The number of blocks is represented by the integer n in the formula (I).

The polyamide blocks can be represented by either of the formulae (IIa) or (IIb) represented above. The blocks of formula (IIa) are polyamides of the type of those obtained by polymerization starting from lactams and/or amino acids. The processes for the polymerization of such compounds are known: mention is made, inter alia, of anionic polymerization or melt polycondensation, for example in a VK tube. The (IIb) blocks are of the type of those obtained by polycondensation of dicarboxylic acids with amines.

Preferably, X represents an oxygen atom, the formula (I) thus being as follows:

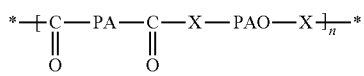

According to the embodiment where the polyamide block is represented by the formula (IIa), the radical $R^1$ is advantageously chosen from the following radicals:
the linear divalent pentyl radical: the polyamide block is then a polyamide 6 block;
the unbranched divalent decyl radical (10 carbon atoms): the polyamide block is then a polyamide 11 block;
the unbranched divalent undecyl radical (11 carbon atoms): the polyamide block is then a polyamide 12 block.

According to the embodiment where the polyamide block is represented by the formula (IIb), the pairs of radicals $R^2$ and $R^3$ are advantageously chosen from the following pairs:
$R^2$=linear divalent butyl radical, $R^3$=linear divalent hexyl radical: polyamide 6,6 block;
$R^2$=linear divalent butyl radical, $R^3$=linear divalent butyl radical: polyamide 4,6 block;
$R^2$=linear divalent octyl radical, $R^3$=linear divalent hexyl radical: polyamide 6,10 block.

The poly(alkylene oxide) block can be chosen from poly(ethylene oxide), poly(trimethylene oxide) or poly(tetramethylene oxide) blocks. In the case where the block is based on poly(ethylene oxide), it can comprise propylene glycol units at the ends of the block.

The average molecular weights of each of the blocks are independent of one another. However, it is preferable for them to be close to one another. The average molecular weight of the PAO blocks is preferably between 1000 and 3000 g/mol. The average molecular weight of the PA blocks is advantageously between 1000 and 3000 g/mol.

The compound of formula (I) can be obtained by catalyzed reaction between polyamide macromolecular chains, the end functional groups of which are carboxylic acid functional groups, and polyetherdiol chains, that is to say poly(alkylene oxide) macromolecular chains, the end functional groups of which are alcohol functional groups. They are, for example, poly(ethylene glycol) chains comprising alcohol endings.

The reaction between the end functional groups of the blocks can be catalyzed by tetraalkyl orthotitanates or zirconyl acetate.

According to a specific embodiment of the invention, the modifying compounds of formula (I) have a melting point of greater than 150° C., preferably of between 150 and 250° C.

The polyamide matrix according to the invention is generally composed of at least one (co)polyamide chosen from the group consisting of: (co)polyamide 6; 4; 11; 12; 4,6; 6,6; 6,9; 6,10; 6,12; 6,18; 6,36; 6(T); 9(T); 6(I); MXD6; their copolymers and/or blends.

Mention may be made, for example, of semicrystalline or amorphous polyamides, such as aliphatic polyamides, semi-aromatic polyamides and more generally linear polyamides obtained by polycondensation between an aliphatic or aromatic saturated diacid and an aromatic or aliphatic saturated primary diamine, polyamides obtained by condensation of a lactam or of an amino acid, or linear polyamides obtained by condensation of a mixture of these various monomers. These copolyamides can, for example, be poly(hexamethylene adipamide), the polyphthalamides obtained from terephthalic and/or isophthalic acid, the copolyamides obtained from caprolactam, and from one or more monomers generally used for the manufacture of polyamides, such as adipic acid, terephthalic acid and/or hexamethylenediamine.

Polyamide 6(T) is a polyamide obtained by polycondensation of terephthalic acid and hexamethylenediamine. Polyamide 9(T) is a polyamide obtained by polycondensation of terephthalic acid and a diamine comprising 9 carbon atoms. Polyamide 6(I) is a polyamide obtained by polycondensation of isophthalic acid and hexamethylene-diamine. Polyamide MXD6 is a polyamide obtained by polycondensation of adipic acid and meta-xylylenediamine.

The composition can comprise one or more (co)polyamides obtained as a blend or as a copolymer, for example.

The polyamide matrix can in particular be a polyamide comprising star or H macromolecular chains and, if appropriate, linear macromolecular chains. The polymers comprising such star or H macromolecular chains are disclosed, for example, in the documents FR 2 743 077, FR 2 779 730, U.S. Pat. No. 5,959,069, EP 0 632 703, EP 0 682 057 and EP 0 832 149.

According to another specific alternative form of the invention, the polyamide matrix of the invention can be a polymer of random tree type, preferably a copolyamide exhibiting a random tree structure. These copolyamides of random tree structure and the process for the preparation thereof are disclosed in particular in document WO 99/03909. The thermoplastic matrix of the invention can also be a composition comprising a linear thermoplastic polymer and a star, H and/or tree thermo-plastic polymer as described above. The thermoplastic matrix of the invention can also comprise a hyperbranched copolyamide of the type of those disclosed in the document WO 00/68298. The thermoplastic matrix of the invention can also comprise any combination of linear, star, H or tree thermoplastic polymer or hyperbranched copolyamide as described above.

According to a specific characteristic of the invention, the polyamide matrix of the composition is composed of a blend of a polyamide with one or more other polymers, preferably of (co)polyamide type. A blend of (co)polyamide with at least one polymer chosen from the group consisting of: polyphenylene ether (PPE), polyvinyl chloride) (PVC), the acrylonitrile-butadiene-styrene (ABS) polymer, polyethylene (PE), polypropylene (PP), polyethylene terephthalate) (PET) and/or poly(butylene terephthalate) (PBT), can also be envisaged.

The polyamide composition according to the invention can comprise reinforcing and/or bulking fillers preferably chosen from the group consisting of fibrous fillers, such as glass fibers, metal fibers or carbon fibers; inorganic fillers, such as clays, kaolin, wollastonite, mica, talc and glass beads; finely dispersible reinforcing nanoparticles, such as montmorillonite; or made of thermosetting material. The level of incorporation of these fillers is in accordance with the standards in the field of composite materials. The level of filler can, for example, be from 1 to 70% by weight, preferably from 10 to 60% by weight, with respect to the total weight of the composition.

The polyamide composition according to the invention can also comprise at least one agent which modifies the impact strength chosen, for example, from the group consisting of: ethylene-propylene (EP) optionally grafted with maleic anhydride, ethylene-propylene-diene (EPDM) terpolymer optionally grafted with maleic anhydride, elastomeric copolymers, such as styrene-maleic anhydride (SMA), for example, ultra-low-density polyethylene (ULDPE), linear low density polyethylene (LLDPE), styrene-butadiene (SBS and SBR) compounds, styrene-ethylene-butadiene-styrene (SEBS) compounds, polypropylene (PP), acrylic elastomers (such as polyacrylate elastomers), copolymers and terpolymers of ethylene with acrylic or methacrylic derivatives and/or with vinyl acetate, ionomers, acrylonitrile-butadiene-styrene (ABS) terpolymer and acrylic-styrene-acrylonitrile (ASA) terpolymer. The modifiers of the impact strength can optionally comprise grafted groups, such as maleic anhydride, for example. The modifiers of the impact strength according to the invention can also be combinations, blends, homopolymers, copolymers and/or terpolymers of the compounds mentioned above. The modifiers of the impact strength are chosen by a person skilled in the art for their compatibility with the polyamide matrix.

The polyamide composition according to the invention can additionally comprise one or more additives commonly used by a person skilled in the art in thermoplastic compositions used in particular for the manufacture of molded articles. Mention may thus be made, as example of additives, of heat stabilizers, flame retardants, molding agents, such as calcium stearate, UV stabilizers, antioxidants, lubricants, abrasion reducers, pigments, dyes, plasticizers, laser marking promoters, waxes or agents which modify the impact strength. By way of examples, the antioxidants and heat stabilizers are, for example, alkaline halides, copper halides, sterically hindered phenolic compounds, organic phosphites and aromatic amines.

The present invention also relates to a process for the preparation of a polyamide composition as defined above in which at least 2% by weight of electrically conductive fillers and at least 1% by weight of antistatic agents are blended with a polyamide matrix, optionally in the molten state.

The blending can be carried out in the molten state, for example in a single- or twin-screw extruder, or by blending without conversion to the molten state, for example in a mechanical mixer. The compounds can be introduced simultaneously or successively. Any means known to a person skilled in the art relating to the introduction of the various compounds of a thermoplastic composition can be used. Use is generally made of an extrusion device in which the material is heated, subjected to a shear force and conveyed. Such devices are fully known to a person skilled in the art.

The composition according to the invention, when it is prepared using an extrusion device, can be put into the form of granules.

The electrically conductive fillers and antistatic agents can be blended beforehand, for example by continuous or batchwise mixing. To do this, use may be made, for example, of a Banbury mixer.

A concentrated blend, preferably based on polyamide, comprising the electrically conductive fillers and/or the antistatic agents, for example prepared according to the method described above, can also be added to the polyamide matrix. This masterblend can, for example, be prepared by preblending the various compounds.

Thus, the present invention also relates to a process for the preparation of a polyamide composition as described above in which at least one polyamide matrix is blended with:
- a concentrated blend based on a thermoplastic matrix comprising at least 20% by weight of electrically conductive fillers, and
- at least 1% by weight of antistatic agents.

The masterblend can comprise, for example, from 20 to 50% by weight of electrically conductive fillers, such as carbon black.

This masterblend is based on a thermoplastic matrix, for example chosen from the group consisting of: a (co)polyamide, an ethylene-vinyl acetate (EVA) copolymer, an ethylene-acrylic acid (EAA), a polyethylene (PE), a polypropylene (PP), their copolymers and/or blends.

It should be noted that the masterblend can also comprise antistatic agents according to the invention.

Numerous methods for blending the (co)polyamides of the invention with the reinforcing and/or bulking fillers, agents which modify the impact strength and/or additives can be envisaged. For example, these can be introduced as a blend with the (co)polyamide in the molten state before the manufacture of granules. Some of these fillers, agents and/or additives can also be added during the polymerization of the (co)polyamide.

The present invention also relates to a process for the manufacture of an article by forming a composition according to the invention by a process chosen from the group consisting of an extrusion process, such as the extrusion of thin sheets and films, a molding process, such as compression molding, and an injection process, such as injection molding.

The articles according to the invention can, for example, be automobile components, in particular bodywork components, pipes intended for the transportation of liquids or gases, tanks, coverings, films and/or covers made of plastic for tanks.

The present invention also relates to a process for the application of paint by electrostatic deposition on an article, characterized in that an article of the invention as described above is used in this process. The paint can be applied to the article, for example, by spraying or immersion. Generally, a process for the application of paint by electrostatic deposition on an article comprises at least the following stages: cataphoresis treatment of the article at temperatures of between 150 and 250° C., application of a primer by electrostatic spraying and application of the paint by electrostatic spraying. Each spraying stage can be followed by stage(s) of heating at temperatures of between 100 and 200° C. and by stage(s) of cooling.

The present invention also relates to an article painted by a process for the application of paint by electrostatic deposition.

Other details or advantages of the invention will become more clearly apparent in the light of the examples given below solely by way of indication.

EXPERIMENTAL PART

Materials Used:
PA 6,6: polyamide 6,6 with a relative viscosity of 2.7 (according to Standard ISO 307 using sulfuric acid as solvent) sold by Rhodia Engineering Plastics under the name Technyl® 27 A00.
PA 6: polyamide 6 with a relative viscosity of 2.7 (according to Standard ISO 307 using sulfuric acid as solvent) sold by Rhodia Engineering Plastics under the name ASN 27 S.
Elastomer: EPR-g-MA: ethylene-propylene copolymer comprising grafted maleic anhydride, with a density of 0.87 g/ml (measured according to ASTM D792) and an MFR of 23 (measured according to ASTM D1238 at 280° C./2.16 kg).
Conductive carbon black: sold by Akzo under the name Ketjen Black 600®.
Polyetheramide: multisegmented block copolymer comprising 50% by weight of polyamide 6 blocks and 50% by weight of polyethylene glycol blocks, X corresponding to an oxygen atom, the average molecular weight of each block of which is approximately 1500 g/mol. Melting point: 204° C. according to Standard ASTM D3418.
Wollastonite: calcium silicate having a particle size of less than 10 μm and an aspect ratio of 5, surface treatment with a coupling agent.
Mica: mica of ground muscovite type having an average particle size, expressed as $D_{50}$, of less than or equal to 40 μm and a bulk density of 450 g/l.
Others: corresponds to a blend of color stabilizer and of lubricants (calcium stearate).
Masterblend MB: blend based on EVA comprising 30% of conductive carbon black Ketjen Black 300®, sold by Iridi Color Srl under the name MBUN NIRO N129.

Example 1

Preparation of Compositions

Polyamide-based compositions are manufactured by blending various compounds mentioned below via a twin-screw extruder. The compositions, the compounds used and their amounts are given in table 1:

TABLE 1

| Formulations | A | B | C | D | E | F | G | 1 | 2 |
|---|---|---|---|---|---|---|---|---|---|
| PA 6, 6 (%) | 54.5 | 56.5 | 58.5 | 59.8 | 60.5 | 55.5 | 50.5 | 58.5 | 57.5 |
| PA 6 (%) | 10 | 10 | 10 | 10 | 0 | 0 | 0 | 0 | 0 |
| Elastomer (%) | 12 | 12 | 12 | 12 | 12 | 12 | 12 | 12 | 12 |
| Mica (%) | 15 | 15 | 15 | 15 | 15 | 15 | 15 | 15 | 15 |
| Others (%) | 2.5 | 2.5 | 2.5 | 2.5 | 2.5 | 2.5 | 2.5 | 2.5 | 2.5 |

TABLE 1-continued

| Formulations | A | B | C | D | E | F | G | 1 | 2 |
|---|---|---|---|---|---|---|---|---|---|
| Polyetheramide (%) | 0 | 0 | 0 | 0 | 10 | 15 | 20 | 10 | 10 |
| Carbon black (%) | 6 | 4 | 2 | 1 | 0 | 0 | 0 | 2 | 3 |
| Adhesion of the paint | + | + | − | − | − | − | − | + | + |
| Surface resistivity (Ω) | n | $5 \times 10^5$ | $7 \times 10^{11}$ | insulator | $25 \times 10^9$ | $25 \times 10^9$ | $25 \times 10^9$ | $16 \times 10^9$ | $5 \times 10^9$ |
| MFI (g/10 min) | 0 | 0.1 | 5.1 | 8.5 | 14 | 15 | 17 | 12 | 10 |
| Notched Charpy impact (kJ/m$^2$) | 5.4 | 5.6 | 5.9 | 6.9 | 8.3 | 8.5 | 9 | 7.5 | 7 |
| Elongation at break (%) | 5.7 | 7.7 | 12.1 | 11.1 | 18 | 21 | 23 | 12.5 | 11 |
| Tensile modulus (N/mm$^2$) | 3540 | 3700 | 3530 | 3510 | 3210 | 3250 | 2910 | 3100 | 3210 |
| HDT (° C.) | 200 | 201 | 206 | 208 | 205 | 202 | 192 | 205 | 205 |

The percentages of the various components are expressed by weight, with respect to the total weight of the composition.

The properties are measured in the following way:

MFI (melt flow index), according to Standard ISO 1133 at 275° C. with a load of 5 kg.

Notched Charpy impact according to Standard ISO 179/1eA at 23° C.

Elongation at break, according to Standard ISO 527 at 23° C.

Tensile modulus, according to Standard ISO 527 at 23° C.

HDT (heat deflection temperature), according to Standard ISO 75Be with a load of 0.45 N/mm$^2$.

Surface resistivity, according to Standard IEC 61340-4-1. Measurement is carried out on an injection-molded sheet (200×150×3 mm) by placing the probes of a device for measuring the resistance (Metriso 2000 ESD) at a distance of 1 cm from one another. A voltage of 100 volts is applied and the surface resistivity of the sheet is measured. The measurement is carried out in a room at a temperature of 23° C. approximately and a relative humidity of 50%.

Adhesion of the paint by electrostatic deposition: a sheet is injection-molded from the above compositions. The paint is applied to the sheets by an "online" process for painting by cataphoresis in seven stages: stage 1: e-coat simulation (cataphoresis treatment) at 185° C. for 30 minutes. Stage 2: cooling for 20 minutes. Stage 3: application of the primer, BASF PMR82, by electrostatic spraying. Stage 4: heating at 160° C. for 30 minutes. Stage 5: cooling for 20 minutes. Stage 6: application of a white paint by electrostatic spraying. Stage 7: cooling for 20 minutes. Poor adhesion of the paint by electrostatic deposition (recorded as—in the above table) is recorded if an orangepeel appearance, a lack of paint and/or poor adhesion of the paint to the sheet are observed. In the contrary case, good adhesion of the paint (recorded as + in the above table) is observed.

In the above table, n means not measured.

Example 2

Preparation of Compositions

Polyamide-based compositions are manufactured by blending various compounds mentioned below via a twin-screw extruder. The compositions, the compounds used and their amounts are given in table 2:

TABLE 2

| Formulations | 3 | 4 |
|---|---|---|
| PA 6,6 (%) | 46.95 | 43.95 |
| Elastomer (%) | 7 | 7 |
| Wollastonite (%) | 26 | 26 |
| Others (%) | 2.05 | 2.05 |
| Polyetheramide (%) | 11 | 10 |
| Masterblend MB (%) | 7 | 11 |
| Adhesion of the paint | + | + |
| Surface resistivity (Ω) | $45 \times 10^9$ | $3 \times 10^9$ |
| MFI (g/10 min) | 23.5 | 18.7 |
| Notched Charpy impact (kJ/m$^2$) | 9.2 | 8 |
| Elongation at break (%) | 12.8 | 10.8 |
| Tensile modulus (N/mm$^2$) | 2730 | 2570 |
| HDT (° C.) | 206 | 206 |

The percentages of the various components are expressed by weight, with respect to the total weight of the composition.

What is claimed is:

1. A process for producing an article, comprising:
    forming an article from a composition comprising a polyamide matrix, wherein the composition comprises:
        2 to 10% by weight of carbon black as an electrically conductive filler, with respect to the total weight of the composition, and
        1% to 30% by weight of one or more antistatic agents, with respect to the total weight of the composition;
    and
    applying paint to the article by electrostatic deposition,
    wherein one of the antistatic agents is a polyetheramide represented by formula (I):

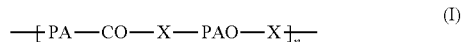

in which:
    n is an integer between 5 and 50;
    X represents an oxygen atom or an NH group;
    PAO represents a poly(alkylene oxide) block;
    PA represents a polyamide block, the repeat unit of which is represented by either of the formulae (IIa) or (IIb):

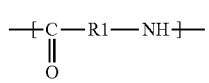

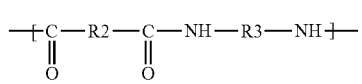

in which: $R^1$, $R^2$ and $R^3$ are aromatic or aliphatic radicals having 4 to 36 carbon atoms.

2. The process of claim 1, wherein the composition exhibits a surface resistivity of between $10^5 \Omega$ and $10^{11} \Omega$, measured according to Standard IEC 61340-4-1.

3. The process of claim 1, wherein the composition has a discharge time of greater than or equal to 10 seconds, measured according to Standard IEC 61340-5-1.

4. The process of claim 1, wherein the composition comprises 5 to 20% by weight of one or more of the antistatic agents, with respect to the total weight of the composition.

5. The process of claim 1, wherein the composition further comprises one or more antistatic agents selected from the group consisting of a sodium alkylsulfonate; an alkylbenzenesulfonate; a primary, secondary, or tertiary amine; an ethoxylated amine; an ethoxylated alcohol; a glyceryl monostearate; a distearate; and a tristearate.

6. The process of claim 1, wherein in formula (I), the radical $R^1$ is a linear divalent pentyl radical.

7. The process of claim 1, wherein in formula (I), the PAO block is a poly(ethylene oxide) block.

8. The process of claim 1, wherein the polyamide matrix is formed from at least one (co)polyamide which is: (co)polyamide 6; 4; 11; 12; 4,6; 6,6; 6,9; 6,10; 6,12; 6,18; 6,36; 6(T); 9(T); 6(I); MXD6; a copolymer thereof; or a blend thereof.

9. The process of claim 1, wherein the composition further comprises at least one modifier of the impact strength selected from the group consisting of ethylene-propylene optionally grafted with maleic anhydride, ethylene-propylene-diene terpolymer optionally grafted with maleic anhydride, styrene-maleic anhydride, ultra-low-density polyethylene, linear low density polyethylene, styrene-butadiene compounds, styrene-ethylene-butadiene-styrene compounds, polypropylene, acrylic elastomers, copolymers and terpolymers of ethylene with acrylic or methacrylic derivatives and/or with vinyl acetate, ionomers, acrylonitrile-butadiene-styrene terpolymer, and acrylic-styrene-acrylonitrile terpolymer.

10. The process of claim 1, wherein the article is formed by an extrusion process, a molding process, or an injection process.

11. A process for producing an article, comprising:

forming an article from a composition comprising a polyamide matrix, wherein the composition comprises:

2 to 10% by weight of carbon black as an electrically conductive filler, with respect to the total weight of the composition, and 1% to 30% by weight of one or more antistatic agents, with respect to the total weight of the composition;

and applying paint to the article by electrostatic deposition, wherein the composition has a discharge time of greater than or equal to 10 seconds, measured according to Standard IEC 61340-5-1, and wherein one of the antistatic agents is a polyetheramide represented by the formula (I):

$$\text{---}[\text{PA}\text{---}\text{CO}\text{---}\text{X}\text{---}\text{PAO}\text{---}\text{X}]_n\text{---}$$

in which:

n is an integer between 5 and 50;

X represents an oxygen atom or an NH group;

PAO represents a poly(alkylene oxide) block;

PA represents a polyamide block, the repeat unit of which is represented by either of the formulae (IIa) or (IIb):

$$\text{---}[\underset{\underset{\text{O}}{\|}}{\text{C}}\text{---}\text{R1}\text{---}\text{NH}]\text{---} \quad \text{(IIa)}$$

$$\text{---}[\underset{\underset{\text{O}}{\|}}{\text{C}}\text{---}\text{R2}\text{---}\underset{\underset{\text{O}}{\|}}{\text{C}}\text{---}\text{NH}\text{---}\text{R3}\text{---}\text{NH}]\text{---} \quad \text{(IIb)}$$

in which: $R^1$, $R^2$ and $R^3$ are aromatic or aliphatic radicals having 4 to 36 carbon atoms.

12. The process of claim 11, wherein the composition exhibits a surface resistivity of between $10^5 \Omega$ and $10^{11} \Omega$, measured according to Standard IEC 61340-4-1.

13. The process of claim 11, wherein the composition comprises 5 to 20% by weight of antistatic agent, with respect to the total weight of the composition.

14. The process of claim 11, wherein the composition further comprises one or more antistatic agents selected from the group consisting of a sodium alkylsulfonate; an alkylbenzenesulfonate; a primary, secondary, or tertiary amine; an ethoxylated amine; an ethoxylated alcohol; a glyceryl monostearate; a distearate; and a tristearate.

15. The process of claim 11, wherein in formula (I), the radical $R^1$ is a linear divalent pentyl radical.

16. The process of claim 11, wherein in formula (I), the PAO block is a poly(ethylene oxide) block.

17. The process of claim 11, wherein the polyamide matrix is formed from at least one (co)polyamide which is: (co)polyamide 6; 4; 11; 12; 4,6; 6,6; 6,9; 6,10; 6,12; 6,18; 6,36; 6(T); 9(T); 6(I); MXD6; a copolymer thereof; or a blend thereof.

18. The process of claim 11, wherein the composition further comprises at least one modifier of the impact strength selected from the group consisting of ethylene-propylene optionally grafted with maleic anhydride, ethylene-propylene-diene terpolymer optionally grafted with maleic anhydride, styrene-maleic anhydride, ultra-low-density polyethylene, linear low density polyethylene, styrene-butadiene compounds, styrene-ethylene-butadiene-styrene compounds, polypropylene, acrylic elastomers, copolymers and terpolymers of ethylene with acrylic or methacrylic derivatives and/or with vinyl acetate, ionomers, acrylonitrile-butadiene-styrene terpolymer, and acrylic-styrene-acrylonitrile terpolymer.

19. The process of claim 11, wherein the article is formed by an extrusion process, a molding process, or an injection process.

20. A process for producing an article, comprising:

forming an article from a composition comprising a polyamide matrix, wherein the composition comprises:

2 to 10% by weight of carbon black as an electrically conductive filler, with respect to the total weight of the composition, and 1% to 30% by weight of antistatic agents, with respect to the total weight of the composition;

and applying paint to the article by electrostatic deposition, wherein one of the antistatic agents is a polyetheramide represented by the formula (I):

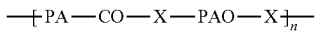

in which:

n is an integer between 5 and 50;

X represents an oxygen atom or an NH group;

PAO represents a poly(alkylene oxide) block;

PA represents a polyamide block, the repeat unit of which is represented by either of the formulae (IIa) or (IIb):

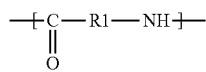 (IIa)

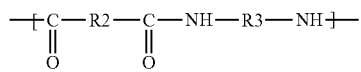 (IIb)

in which: $R^1$, $R^2$ and $R^3$ are aromatic or aliphatic radicals having 4 to 36 carbon atoms and wherein the composition further comprises one or more antistatic agents selected from the group consisting of a sodium alkylsulfonate; an alkylbenzenesulfonate; a primary, secondary, or tertiary amine; an ethoxylated amine; an ethoxylated alcohol; a glyceryl monostearate; a distearate; and a tristearate.

21. The process of claim 20, wherein the composition exhibits a surface resistivity of between $10^5\Omega$ and $10^{11}\Omega$, measured according to Standard IEC 61340-4-1.

22. The process of claim 20, wherein the composition has a discharge time of greater than or equal to 10 seconds, measured according to Standard IEC 61340-5-1.

23. The process of claim 20, wherein the composition comprises 5 to 20% by weight of antistatic agent, with respect to the total weight of the composition.

24. The process of claim 20, wherein in formula (I), the radical $R^1$ is a linear divalent pentyl radical.

25. The process of claim 20, wherein in formula (I), the PAO block is a poly(ethylene oxide) block.

26. The process of claim 20, wherein the polyamide matrix is formed from at least one (co)polyamide which is: (co)polyamide 6; 4; 11; 12; 4,6; 6,6; 6,9; 6,10; 6,12; 6,18; 6,36; 6(T); 9(T); 6(I); MXD6; a copolymer thereof; or a blend thereof.

27. The process of claim 20, wherein the composition further comprises at least one modifier of the impact strength selected from the group consisting of ethylene-propylene optionally grafted with maleic anhydride, ethylene-propylene-diene terpolymer optionally grafted with maleic anhydride, styrene-maleic anhydride, ultra-low-density polyethylene, linear low density polyethylene, styrene-butadiene compounds, styrene-ethylene-butadiene-styrene compounds, polypropylene, acrylic elastomers, copolymers and terpolymers of ethylene with acrylic or methacrylic derivatives and/or with vinyl acetate, ionomers, acrylonitrile-butadiene-styrene terpolymer, and acrylic-styrene-acrylonitrile terpolymer.

28. The process of claim 20, wherein the article is formed by an extrusion process, a molding process, or an injection process.

* * * * *